This invention comprises a vessel located, preferably, in the cooling fluid upper hose line of an internal combustion engine. This vessel has a removable top and a removable filter element. The filter element may have a removable preformed cartridge of metal cloth or suitable porous material. It is preferred that this filter trap top should be located higher than the fluid level in the upper radiator chamber, so that the lid can be taken off and the element removed quickly without the loss of any substantial amount of cooling fluid.

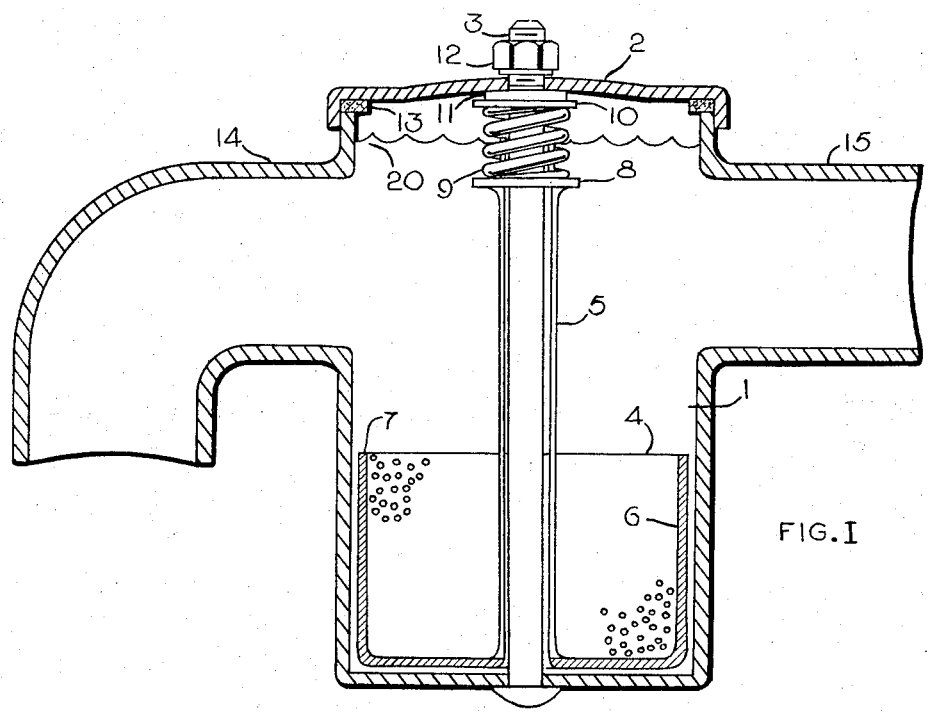
FIG. I
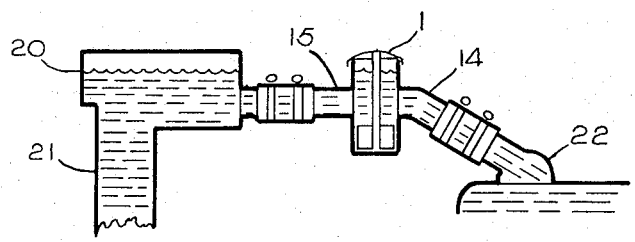
FIG. II
INVENTOR.
DONALD L. SELLMAN

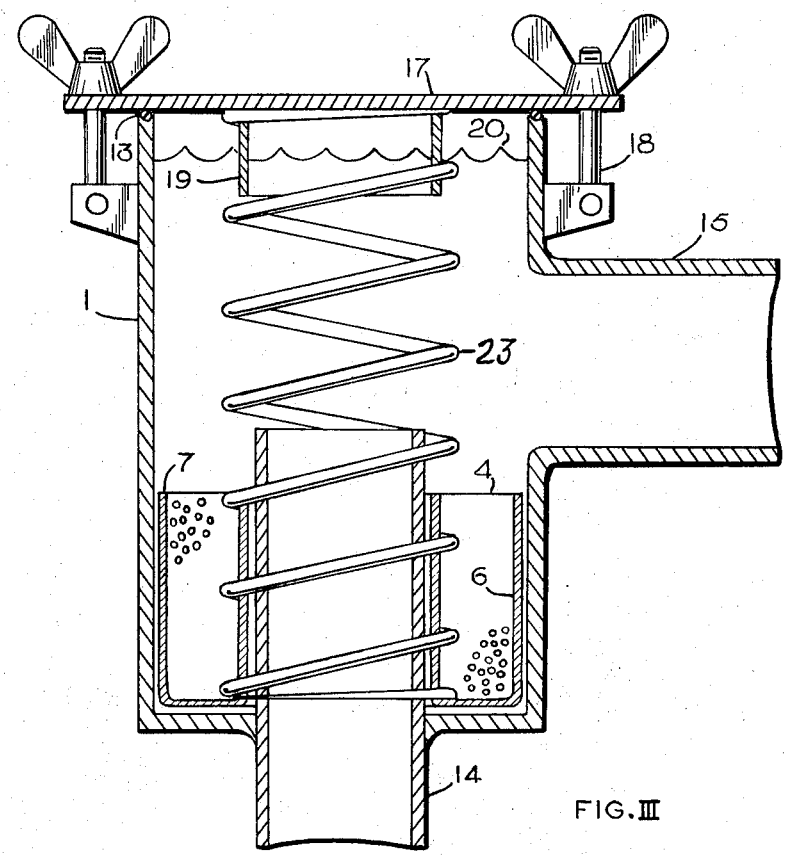
FIG. III 3,362,536
REMOVABLE ELEMENT TYPE
FILTER TRAPS
Donald L. Sellman, Lincoln, Kans.
(Box 127, Stanley, Kans. 66084)
Filed June 10, 1964, Ser. No. 373,956
3 Claims. (Cl. 210—167)

An important object of this invention is to provide a low priced removable element type filter trap that will not make any obstruction to the natural and continuous flow of the cooling fluids.

Another object of this invention is to provide a removable element type filter trap in which the filter element can be quickly changed without any substantial loss of cooling fluid. Another object is to provide a removable preformed filter cartridge for the filter element that will be discardable because of low price and which can be quickly taken out of the element and replaced with a new cartridge.

A further object of this invention is to provide a filter of this type in which the filter element can be cleaned and used several times.

A still further object of this invention is to provide a removable top filter trap in the upper hose line of an internal combustion engine which provides a place to collect and skim off foam, oil or other floating impurities in the cooling fluid.

Another object of this invention is to provide a filter trap, that has a removable filter element; that is compact and durable, and needs no other supporting means than the hose line; and that can be quickly installed at low cost.

An additional object of this invention is to provide a removable element type filter trap, whose filter element can be removed by unskilled help, and without burning hands or soiling clothes.

The main object of this invention is to provide a filter that will provide constant protection of the radiator's core passways by eliminating from the cooling fluids materials that will clog or eventually clog said passways. It will guard against excessive fuel consumption, lubrication failure, warping of cylinder heads, scoring of block and piston rings and eventual ruin of the engine, and help conserve our copper and tin supply.

The general object is to provide at low cost a long and much needed improvement.

Other uses and advantages will be apparent from the following specifications.

My invention is illustrated in the accompanying drawings, in which like characters denote corresponding parts.

In the cross sectional view FIG. I, 1 is the filter trap vessel, 3 is a centrally located bolt reaching from the bottom of the vessel, 2 is the vessel lid which has a centrally located hole through which bolt 3 projects, 4 is the perforated, removable cup shaped filter element, 5 is the stem or sleeve that is the center part of the filter element and fits over bolt 3, 6 is the perforated inner wall of the filter element that holds the permanently attached or detachable filter cartridge 7 in place, 8 is the shoulder near the top of the stem 5 on which spring 9 rests to hold the element at the bottom of the trap by compressing spring 9 when drawing up nut 12 on bolt 3, 13 is the gasket that makes the seal between the lid and tank sides, and 11 is the bolt gasket held in place by washer 10 to seal the opening in the lid through which bolt 3 projects, 14 is the intake opening and hose connection, and 15 is the outlet opening and hose connection.

In the cross sectional view FIG. II, 21 is the upper chamber of the radiator showing the fluid line 20, the location of the filter trap 1 in the upper hose line, connected at 14 to the intake and at 15 to the outlet. FIGURE II also shows the top of the filter trap vessel above fluid line 20, and 22 is the upper hose line connection of an internal combustion engine.

On cross section view FIG. III, the intake 14 is at the bottom of the vessel, 15 is the outlet to the upper chamber hose connection of the radiator, 20 is the fluid line, 4 is the filter element, 7 is the filter element cartridge, 23 is the spring that is held in place on the under side of the lid by the guide 19, spring 23 is either attached permanently or detachable to the filter cup element, which it holds to the bottom of the trap vessel by pressure on the spring, when lid 17 is secured in place by tightening up bolts 18, and 13 is a gasket of suitable material such as neoprene.

In recent years many automobile manufactures are making radiator tubes or clearances that are no more than $25/1000$ of an inch in diameter. Obviously, any tube or clearance so minute can become quickly clogged and obstructed when rust, scale, foundry sand, sediment, muck, and contamination are circulated through these narrow passages. Clogging or partially clogging these passages will result in increased fuel consumption, power lost, lubrication failure, which results in engine destruction, besides time lost, annoyance, and the destruction of radiators. This destruction of radiators ties up a large amount of copper and tin required to make these replacements, that otherwise could be available for other uses.

The filter element is withdrawn from the filter vessel slowly, letting the cooling fluid run back through the perforated sides and porous filter cartridge. This cup shaped element makes a holding container for rust, foundry sand, scale, and other sediment, and the cartridge, which is made of some suitable material such as metallic cloth or fibre, will incase and hold much fine material and contamination.

It is understood that various changes in shape, size, and arrangement of parts may be resorted to without departing from the spirit of my invention, or the scope of the subjoined claims.

Having thus described my invention, I claim:
1. In an upper cooling fluid hose line disposed between the cylinder head of an internal combustion engine and the upper hose connection of a radiator connected thereto, a trap for sediment comprising: an axially vertically disposed casing defining a chamber having a top opening which is located at a level above the engine and radiator structure and a lid closing said opening whereby the cooling fluid therein will not overflow said opening when said lid is removed, inlet and outlet openings in said casing, guide means axially disposed in said casing, a pervious cup-shaped element axially received on said guide means and removably seated in said casing, spring means between said lid and said element and around said guide means biasing said element against the bottom of said casing with a sediment collecting portion of said element disposed below the inlet and outlet openings whereby foreign particle may settle by gravity into said element for removal therewith.

2. The combination of claim 1 wherein the inlet and outlet openings are in the side wall of the casing.

3. The combination of claim 1 wherein the inlet opening is at the top of an axial intake tube entering the bottom of the casing.

References Cited

UNITED STATES PATENTS

| | | | |
|---|---|---|---|
| 295,926 | 4/1884 | Learned | 210—448 X |
| 2,011,031 | 8/1935 | Birch | 210—167 X |
| 2,034,242 | 3/1936 | Mautner | 210—310 |
| 2,692,086 | 10/1954 | Butler | 210—532 X |
| 2,728,458 | 12/1955 | Schultz | 210—238 |

FOREIGN PATENTS 1,091,818 11/1954 France.

REUBEN FRIEDMAN, *Primary Examiner.*

SAMIH N. ZAHARNA, *Examiner.*

F. W. MEDLEY, *Assistant Examiner.*